United States Patent
Hirota

(10) Patent No.: US 7,131,323 B2
(45) Date of Patent: Nov. 7, 2006

(54) TIRE INFLATION PRESSURE SENSING APPARATUS WITH FUNCTION OF SPARE WHEEL IDENTIFICATION

(75) Inventor: Takahisa Hirota, Toyohashi (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/210,777

(22) Filed: Aug. 25, 2005

(65) Prior Publication Data

US 2006/0042368 A1 Mar. 2, 2006

(30) Foreign Application Priority Data

Aug. 25, 2004 (JP) ............................. 2004-244967

(51) Int. Cl.
*G01C 23/00* (2006.01)
(52) U.S. Cl. ..................... 73/146; 340/442; 340/444; 340/447; 73/146.3
(58) Field of Classification Search ....... 73/146–146.8; 340/442, 444–447
See application file for complete search history.

(56) References Cited

U.S. PATENT DOCUMENTS

| | | | |
|---|---|---|---|
| 6,362,731 B1 * | 3/2002 | Lill | 340/445 |
| 6,897,770 B1 * | 5/2005 | Lill | 340/445 |
| 7,010,968 B1 * | 3/2006 | Stewart et al. | 73/146 |
| 2003/0197604 A1 | 10/2003 | Ogawa et al. | |
| 2003/0214395 A1 * | 11/2003 | Flowerday et al. | 340/445 |

FOREIGN PATENT DOCUMENTS

| | | |
|---|---|---|
| JP | 2003-118333 | 4/2003 |
| JP | 2003-306017 | 10/2003 |
| JP | 2003-312220 | 11/2003 |
| WO | WO 03/086787 A1 | 10/2003 |

* cited by examiner

*Primary Examiner*—Edward Lefkowitz
*Assistant Examiner*—Jermaine Jenkins
(74) *Attorney, Agent, or Firm*—Posz Law Group, PLC

(57) ABSTRACT

A tire inflation pressure sensing apparatus according to the invention includes a first pressure sensor, a first transmitter, a second pressure sensor, a second transmitter, and a receiver. The first pressure sensor and first transmitter are provided on a running wheel of a vehicle. The first transmitter works to send out a pressure signal generated by the first pressure sensor upon being triggered by a trigger signal. The second pressure sensor and second transmitter are provided on a spare wheel of the vehicle. The second transmitter works to send out a pressure signal generated by the second pressure sensor upon being triggered by the trigger signal. The receiver is provided on the body of the vehicle and works to send out the trigger signal and identify whether a pressure signal received thereby is sent out from the first transmitter or the second transmitter based on a RSSI signal generated therefor.

6 Claims, 3 Drawing Sheets

TIRE INFLATION PRESSURE SENSING APPARATUS WITH FUNCTION OF SPARE WHEEL IDENTIFICATION

CROSS-REFERENCE TO RELATED APPLICATION

This application claims priority from Japanese Patent Application No. 2004-244967, filed on Aug. 25, 2004, the content of which is hereby incorporated by reference into this application.

BACKGROUND OF THE INVENTION

1. Technical Field of the Invention

The present invention relates generally to tire inflation pressure sensing apparatuses or sensors. More particularly, the invention relates to a direct-type tire inflation pressure sensing apparatus for use in an automotive vehicle, which has a function of identifying a spare wheel of the vehicle.

2. Description of the Related Art

Conventional direct-type tire inflation pressure sensing apparatuses generally include a plurality of transmitters and a receiver.

Each of the transmitters is directly installed to one of a plurality of running wheels of a vehicle and includes a pressure sensor working to sense the inflation pressure of a tire mounted on the running wheel. Each of the transmitters is configured to send out a pressure signal representative of the inflation pressure of the tire sensed by the pressure sensor.

The receiver is installed to the body of the vehicle and includes a plurality of antennas each of which corresponds to one of the transmitters. The receiver is configured to receive the pressure signals sent out from the transmitters through the respective antennas and determine the inflation pressures of the tires based on the received pressure signals.

With the above arrangement, when the receiver receives all the pressure signals sent out from the transmitters at the same time, it cannot identify from which one of the transmitters each of the received pressure signals is sent out.

In order for the receiver to identify the pressure signals, each of the transmitters may be configured to send out the pressure signal upon being triggered by a trigger signal. At the same time, the receiver may be configured to sequentially send out the trigger signals, one to each of the transmitters, through the respective antennas, so that it can receive the pressure signals sent out from the transmitters at different times. As a result, the receiver can identify each of the pressure signals sent out from the transmitters and accurately determine the inflation pressure of each of the tires based on the corresponding pressure signal.

However, in the above case, the receiver may receive more than one pressure signal at the same time when a spare wheel of the vehicle is located close to one of the running wheels.

Specifically, the spare wheel is generally accommodated in a rear trunk of the vehicle, so that it can be positioned close to one of the antennas that corresponds to one of the transmitters on the rear running wheels of the vehicle. Thus, in some cases, when the receiver sends out the trigger signal through the antenna, both the transmitters on the rear running wheel and spare wheel of the vehicle are triggered to send out the respective pressure signals. As a result, the receiver receives two pressure signals at almost the same time, so that it cannot identify whether each of the two pressure signals is sent out from the transmitter on the rear running wheel or that on the spare wheel.

To solve such a problem, an approach is proposed in Japanese Patent First Publication No. 2003-306017, an English equivalent of which is International Publication WO03086787. According to the approach, both the transmitters on the rear running wheel and spare wheel of the vehicle continuously send out the respective pressure signals during at least one revolution of the running wheels. The receiver then monitors both the continuously sent out pressure signals and identifies each of those based on the monitoring results. Specifically, if one of those pressures signals varies with rotation of the running wheels, it is sent out from the transmitter on the rear running wheel; Otherwise, it is from the transmitter on the spare wheel.

However, continuously sending out the pressure signals increases electrical power consumption of the transmitters. For example, when the vehicle runs at a general speed of 60 km/h, it takes about 0.1 second for the running wheels of the vehicle to complete one revolution. Keeping transmissions of the pressure signals for such a long time only for the purpose of spare wheel identification is very disadvantageous to the lives of the batteries provided in the transmitters.

Further, for the purpose of spare wheel identification, one may consider applying other special signals sent out from the transmitters to the receiver, instead of the pressure signals. However, this will require additional devices and make the structure of the tire inflation pressure sensing apparatus unnecessarily sophisticated, thus increasing manufacturing cost of the sensing apparatus.

SUMMARY OF THE INVENTION

The present invention has been made in view of the above-mentioned problem.

It is, therefore, a primary object of the present invention to provide a tire inflation pressure sensing apparatus for use in an automotive vehicle, which can identify a pressure signal sent out from a transmitter provided on a spare wheel of the vehicle, without increasing electrical power consumption of the transmitter and making the structure thereof unnecessarily sophisticated.

According to the first aspect of the invention, a tire inflation pressure sensing apparatus is provided which includes a first pressure sensor, a first transmitter, a second pressure a sensor, a second transmitter, and a receiver.

The first pressure sensor is provided on a running wheel of a vehicle. The first pressure sensor works to sense an inflation pressure of a tire mounted on the running wheel and generate a pressure signal representative of the sensed inflation pressure.

The first transmitter is provided on the running wheel of the vehicle. The first transmitter is configured to send out the pressure signal generated by the first pressure sensor upon being triggered by a trigger signal.

The second pressure sensor is provided on a spare wheel of the vehicle. The second pressure sensor works to sense an inflation pressure of a tire mounted on the spare wheel and generate a pressure signal representative of the sensed inflation pressure.

The second transmitter is provided on the spare wheel of the vehicle. The second transmitter is configured to send out the pressure signal generated by the second pressure sensor upon being triggered by the trigger signal.

The receiver is provided on a body of the vehicle. The receiver is configured to:

send out the trigger signal;

operate in a first mode if only the pressure signal sent out from the first transmitter is received, in the first mode the receiver determining the inflation pressure of the tire on the running wheel of the vehicle based on the received pressure signal; and operate in a second mode if both the pressure signals sent out from the first and the second transmitters are received, in the second mode the receiver generating one RSSI (Received Signal Strength Indicator) signal for each of the two pressure signals, identifying whether each of the two pressure signals is sent out from the first transmitter or the second transmitter based on the RSSI signal generated therefor, and determining the inflation pressure of the tire on the running wheel of the vehicle based on the pressure signal sent out from the first transmitter.

According to the second aspect of the invention, in the above tire inflation pressure sensing apparatus, the receiver identifies, in the second mode, one of the two pressure signals as being sent out from the first transmitter if a variation of a level of the RSSI signal generated therefor is greater than a predetermined threshold, or as being sent out from the second transmitter otherwise.

Further, when both the variations of the levels of the RSSI signals generated for the two pressure signals are not greater than the predetermined threshold, the receiver repeatedly sends out the trigger signal at predetermined time intervals until either of the variations of the levels of the RSSI signals exceeds the predetermined threshold.

According to the third aspect of the invention, the above tire inflation pressure sensing apparatus further includes a plurality of first pressure sensors and a plurality of first transmitters.

Each of the first pressure sensors is provided on one of a plurality of running wheels of the vehicle and works to sense an inflation pressure of a tire mounted on a corresponding one of the running wheels and generate a pressure signal representative of the sensed inflation pressure.

Each of the first transmitters is provided on one of the running wheels of the vehicle and is configured to send out the pressure signal generated by a corresponding one of the pressure sensors upon being triggered by a trigger signal.

Further, the receiver is configured to:

sequentially send out the trigger signals, one to each of all the first transmitters, so that the receiver receives the pressure signals sent out from all the first transmitters at different times;

operate in the first mode if only the pressure signal sent out from one of all the first transmitters is received within a predetermined time period from sending out of a corresponding one of the trigger signals, in the first mode the receiver determining the inflation pressure of the tire mounted on a corresponding one of all the running wheels of the vehicle based on the received pressure signal; and operate in the second mode if both the pressure signals sent out from one of all the first transmitters and the second transmitter are received within the predetermined time period from sending out of a corresponding one of the trigger signals, in the second mode the receiver generating one RSSI signal for each of the two pressure signals, identifying whether each of the two pressure signals is sent out from the one of all the first transmitters or the second transmitter based on the RSSI signal generated therefor, and determining the inflation pressure of the tire mounted on a corresponding one of all the running wheels of the vehicle based on the pressure signal sent out from the one of all the first transmitters.

With the above arrangement, the tire inflation pressure sensing apparatus according to the invention can reliably identify whether each of the pressure signals is sent out from one of the first transmitters (i.e., the transmitters on the running wheels of the vehicle) or the second transmitter (i.e., the transmitter on the spare wheel of the vehicle), without increasing electrical power consumption of the transmitters and making the structure thereof unnecessarily sophisticated.

BRIEF DESCRIPTION OF THE DRAWINGS

The present invention will be understood more fully from the detailed description given hereinafter and from the accompanying drawings of the preferred embodiment of the invention, which, however, should not be taken to limit the invention to the specific embodiment but are for the purpose of explanation and understanding only.

In the accompanying drawings.

DESCRIPTION OF THE PREFERRED EMBODIMENT

Figure 1:
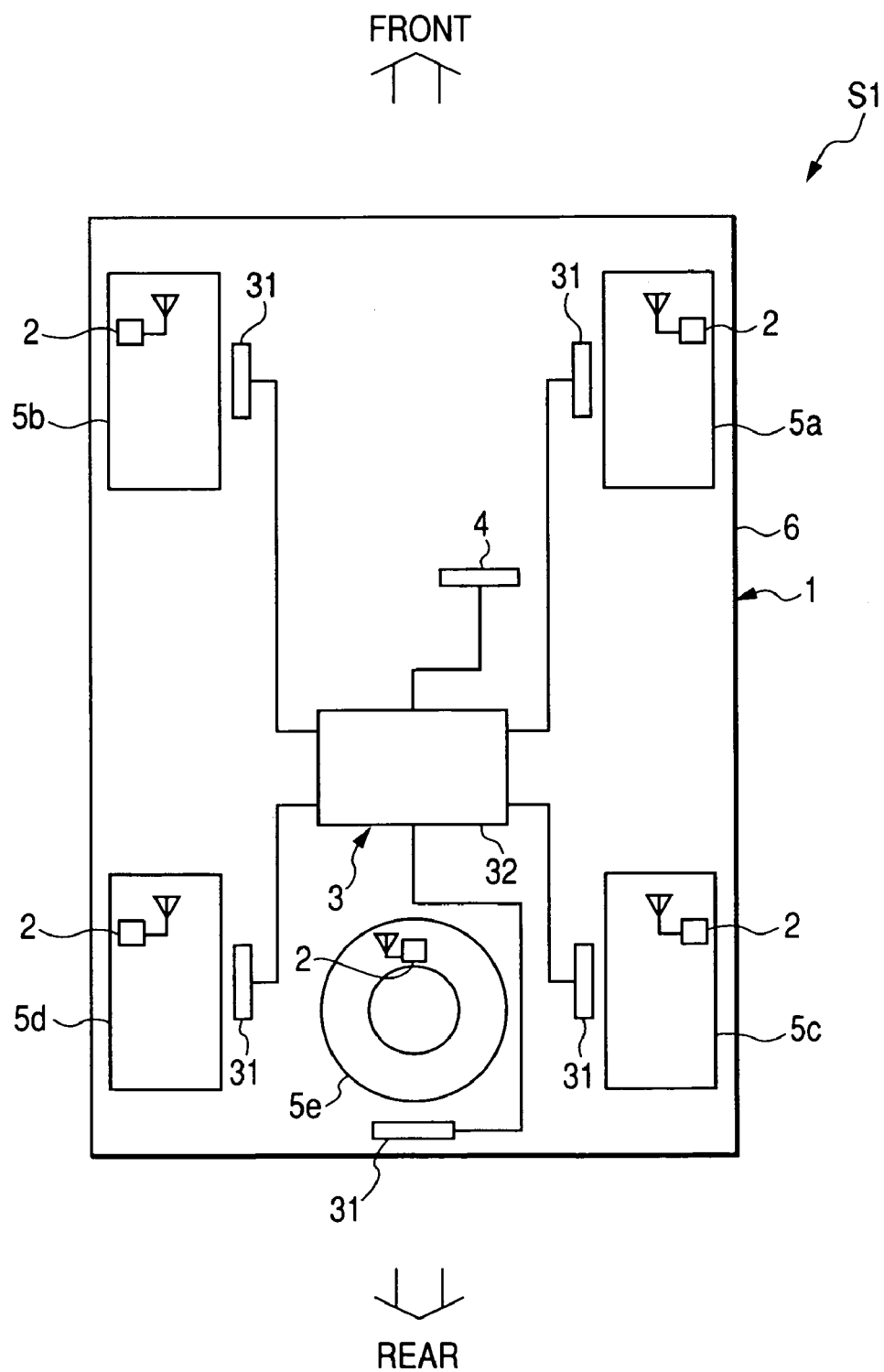
FIG. 1 is a schematic view illustrating the overall configuration of a tire inflation pressure sensing apparatus according to an embodiment of the invention.

The preferred embodiment of the present invention will be described hereinafter with reference to FIGS. 1–3.

It should be noted that, for the sake of clarity and understanding, identical components having identical functions have been marked, where possible, with the same reference numerals in each of the figures.

FIG. 1 shows the overall configuration of a direct-type tire inflation pressure sensing apparatus SI according to an embodiment of the invention.

The tire inflation pressure sensing apparatus SI is installed to a vehicle 1; it is configured to sense inflation pressures of five tires each of which is mounted on one of four running wheels 5a–5d (i.e., the front-right wheel 5a, the front-left wheel 5b, the rear-right wheel 5c, and the rear-left wheel 5d) and a spare wheel 5e of the vehicle 1.

As shown in FIG. 1, the tire inflation pressure sensing apparatus SI includes five transmitters 2, each of which is installed to one of the five wheels 5a–5e, a receiver 3 installed to the body 6 of the vehicle 1, and a warning device 4 electrically connected to the receiver 3.

Each transmitter 2 is configured to sense an inflation pressure of a corresponding one of the five tires and send out a frame, which contains a pressure signal representative of the sensed inflation pressure, in response to a trigger signal sent out from the receiver 3.

Figure 2A:
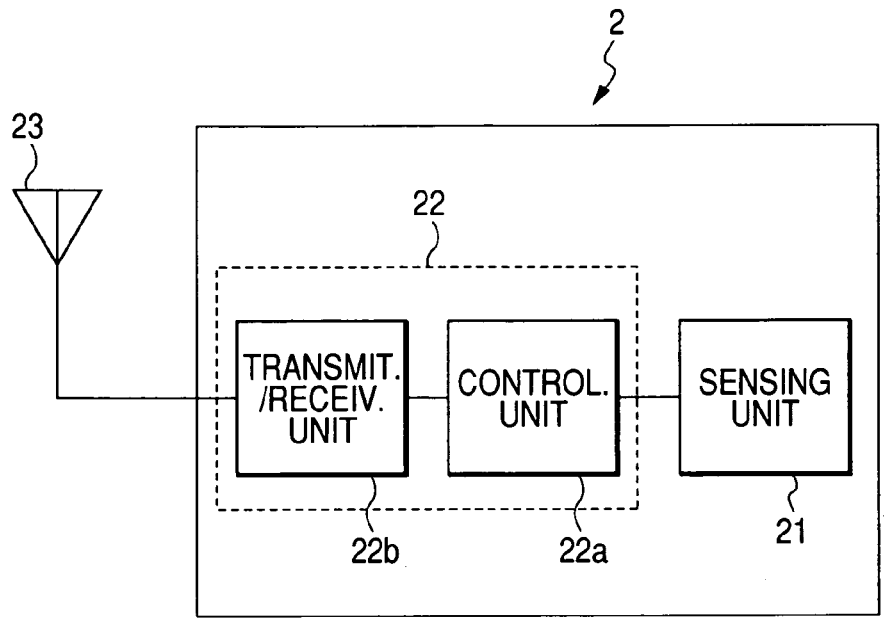
FIG. 2A is a block diagram showing the overall configuration of a transmitter of the tire inflation pressure sensing apparatus of FIG. 1.

Referring to FIG. 2A, each transmitter 2 includes a sensing unit 21, a microcomputer 22, and an antenna 23.

The sensing unit 21 is configured with sensors, such as a diaphragm-type pressure sensor and a temperature sensor, and works to output signals representative of the sensed inflation pressure of the tire and the temperature of air within the tire.

The microcomputer 22 is of a well-known type, which is configured with a CPU (Central Processing Unit), a ROM (Read Only Memory), a RAM (Random Access Memory), and I/O (Input/output) devices.

The microcomputer 22 functionally includes a controlling unit 22a and a transmitting/receiving unit 22b, which are realized by a program installed in the ROM when the program is activated. The two units 22a and 22b are configured to implement predetermined processes in accordance with the program.

Specifically, the controlling unit 22a receives signals outputted from the sensing unit 21 and processes those signals. Then, the controlling unit 22a stores in a frame the processed signals and provides the frame to the transmitting/receiving unit 22b.

The transmitting/receiving unit 22b receives, through the antenna 23, the trigger signal that is sent out from the receiver 3 at predetermined time intervals. After passing of a predetermined time from reception of the trigger signal, the transmitting/receiving unit 22b sends out the frame provided by the controlling 22a through the antenna 23.

The above-described transmitters 2 each are mounted to an air valve of a corresponding one of the wheels 5a–5e such that at least the sensing unit 21 thereof is located inside the tire so as to be exposed to the air within the tire.

The receiver 3 is configured to send out the trigger signals, one to each of the transmitters 2 on the running wheels 5a–5d, receive frames transmitted from the transmitters 2, and determine the inflation pressures of the tires based on the signals contained in the received frames.

Figure 2B:
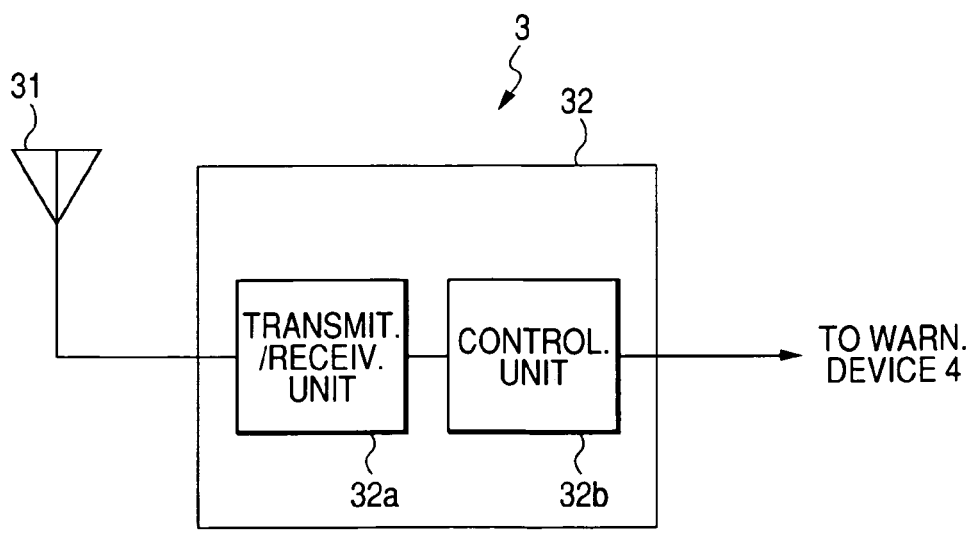
FIG. 2B is a block diagram showing the overall configuration of a receiver of the tire inflation pressure sensing apparatus of FIG. 1.

Referring to FIG. 1 and FIG. 2B, the receiver 3 includes four antennas 31 and a microcomputer 32 that is connected to each of the antennas 31 with a coaxial cable.

Each antenna 31 is disposed on the body 6 of the vehicle 1 corresponding to one of the four running wheels 5a–5d. For example, each antenna 31 is positioned away from the corresponding running wheel by a given distance and fixed to the body 6 of the vehicle 1.

The microcomputer 32 is of a well-known type, which is configured with a CPU, a ROM, a RAM, and I/O devices.

The microcomputer 32 functionally includes a transmitting/receiving unit 32a and a controlling unit 32b, which are realized by a program installed in the ROM of the microcomputer 32 when the program is activated. The two units 32a and 32b are configured to implement predetermined processes in accordance with the program.

Specifically, the transmitting/receiving unit 32a sequentially sends out the trigger signals provided by the controlling unit 32b, one to each of the transmitters 2 on the running wheels 5a–5d, through the respective antennas 31. Consequently, the transmitting/receiving unit 32a receives all the frames sent out from the transmitters 2 on the running wheels 5a-5d through the respective antennas 31 at different times.

Accordingly, it is possible for the controlling unit 32b to identify from which one of the transmitters 2 on the running wheels 5a–5d each of the frames provided by the transmitting/receiving unit 32a is sent out. Briefly speaking, the controlling unit 32b can identity each of the transmitters 2 on the running wheels 5a–5d.

The controlling unit 32b selectively operates in two different modes.

Specifically, the controlling unit 32b enters into the first mode if only one frame is received within a predetermined time period from the sending out of one of the trigger signals.

In the first mode, the controlling unit 32b identifies, based on the received time of the frame, the transmitter 2 from which the frame is sent out. Then, the controlling unit 32b determines, based on the signals contained in the frame, the inflation pressure of the tire corresponding to the identified transmitter 2 and the temperature of air within the tire. When the determined air temperature falls out of a given range, the controlling unit 32b conducts temperature-compensation for the determined inflation pressure.

Otherwise, the controlling unit 32b enters into the second mode if two frames are received within the predetermined time period from the sending out of one of the trigger signals.

In the second mode, the controlling unit 32b generates one RSSI (Received Signal Strength Indicator) signal for each of the two received frames during reception thereof. Then, the controlling unit 32b identifies whether each of the two frames is sent out from one of the transmitters 2 on the running wheels 5a–5d or the transmitter 2 on the spare wheel 5e based on the RSSI signal generated therefor.

More specifically, the controlling unit 32b identifies one of the two frames as being sent out from one of the transmitters 2 on the running wheels 5a–5d if the variation of a level of the RSSI signal generated therefor with time is greater than a predetermined threshold, or as being sent out from the transmitter 2 on the spare wheel 5e otherwise. The level of the RSSI signal may be represented by, for example, the voltage of the RSSI signal.

This is because the level of the RSSI signal generated for one of the frames sent out from the transmitters 2 on the running wheels 5a–5d varies with rotation of the running wheels due to the change in relative position between the transmitter 2 and the corresponding antenna 31. In comparison, the level of the RSSI signal generated for the frame sent out from the transmitter 2 on the spare wheel 5e almost does not vary, since the spare wheel 5e remains stationary with respect to any of the antennas 31.

Figure 3A:
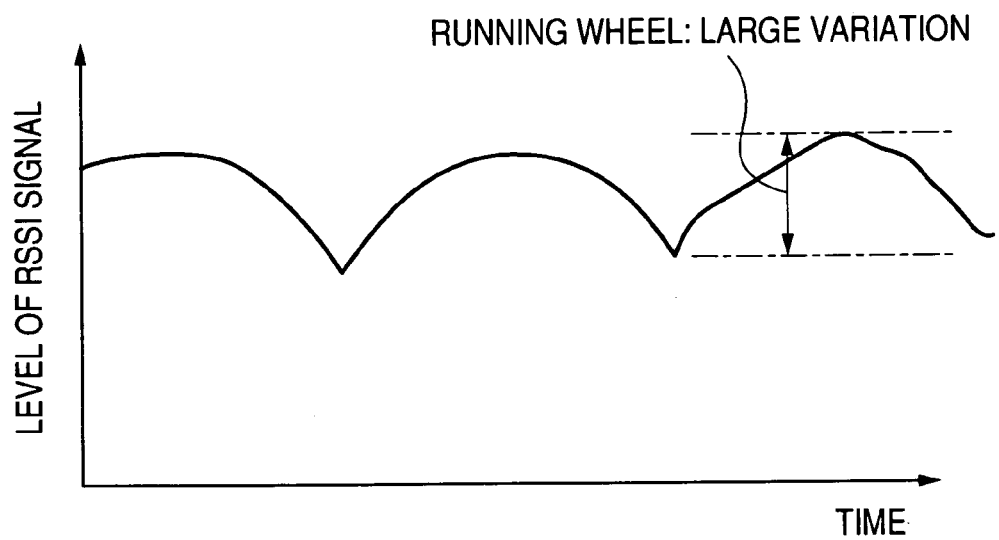
FIG. 3A is a graphical representation illustrating the variation of a level of a RSSI signal generated for a pressure signal sent out from a transmitter on a running wheel of a vehicle.
Figure 3B:
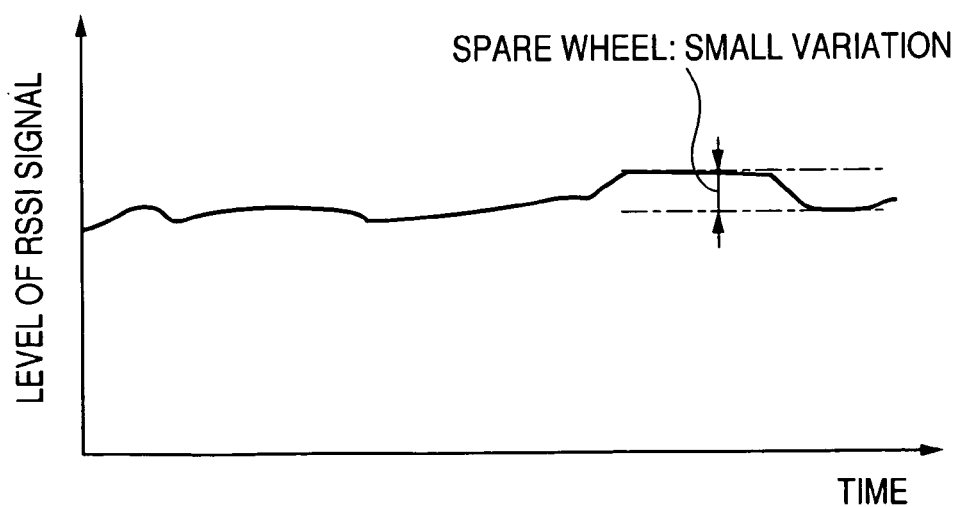
FIG. 3B is a graphical representation illustrating the variation of the level of a RSSI signal generated for a pressure signal sent out from a transmitter on a spare wheel of the vehicle.

FIG. 3A illustrates the variation of the level of the RSSI signal generated for one of the frames sent out from the transmitters 2 on the running wheels 5a–5d, while FIG. 3B illustrates that of the RSSI signal generated for the frame sent out from the transmitter 2 on the spare wheel 5e.

As seen from the FIGS. 3A–3B, the variation of the level of the RSSI generated for one of the frames sent out from the transmitters 2 on the running wheels 5a–5d is considerably greater than that of the RSSI signal generated for the frame sent out from the transmitter 2 on the spare wheel 5e.

Accordingly, it is possible for the controlling unit 32b to identify whether each of the two frames is sent out from one of the transmitters 2 on the running wheels 5a–5d or from the transmitter 2 on the spare wheel 5e by comparing the variation of the level of the RSSI signal generated therefor with the predetermined threshold. Further, as in the first mode, it is also possible for the controlling unit 32b to identify from which one of the transmitters 2 on the running wheels 5a–5d one of the two frames is sent out based on the received time thereof.

After identification of the two frames, the controlling unit 32b determines, based on the signals contained in the received frames, the inflation pressures of the two tires on the corresponding one of the running wheels 5a–5d and the spare wheel 5e and the temperatures of air within the two tires. When the determined air temperatures fall out of the given range, the controlling unit 32b conducts temperature-compensation for the determined inflation pressures.

Further, the controlling unit 32b compares each of the determined inflation pressures of the tires with a predefined threshold pressure and outputs a warning signal to the warning device 4 when it is lower than the predefined threshold pressure.

The warning device 4 is arranged, as shown in FIG. 1, in a place that is visible for the driver of the vehicle 1. The warning device 4 may be configured with at least one of a warning lamp, a warning display, and a warning buzzer, all of which may be disposed in the instrument panel of the vehicle 1. The warning device 4 informs the driver of a decrease in the inflation pressures of the tires upon receiving a warning signal outputted from the controlling unit 32b.

Having described the overall configuration of the tire inflation pressure sensing apparatus S1, operation thereof will be described hereinafter.

First, in each of the transmitters 2, the controlling unit 22a receives signals outputted from the sensing unit 21, which are representative of the inflation pressure of the tire and the temperature of air within the tire, and performs necessary signal processing on those signals. Then, the controlling unit 22a stores in a frame the processed signals.

Next, the transmitting/receiving unit 32a of the receiver 3 sequentially sends out the trigger signals, one to each of the transmitters 2 on the running wheels 5a–5d, through the respective antennas 31, so that those transmitters 2 are triggered to send out the respective frames at different times. Consequently, the transmitting/receiving unit 32a receives all the frames sent out from the transmitters 2 on the running wheels 5a–5d, through the respective antennas 31 at different times, and provides the received frames to the controlling unit 32b of the receiver 3.

Then, the controlling unit 32b enters into either the first mode or the second mode, depending on the number of frames it receives within the predetermined time period from the sending out of one of the trigger signals.

If only one frame is received, the controlling unit 32b enters into the first mode, in which it identifies, based on the received time of the fame, the transmitter 2 from which the frame is sent out and determines the inflation pressure of the tire corresponding to the identified transmitter 2.

Otherwise, if two frames are received, the controlling unit 32b enters into the second mode, in which it identifies, based on the RSSI signals generated therefor and the received time thereof, the transmitters 2 from which the two frames are sent out and determines the inflation pressures of the tires corresponding to the identified transmitters 2.

After that, the controlling unit 32b compares each of the determined inflation pressures of the tires with the predefined threshold pressure and outputs a warning signal to the warning device 4 when it is lower than the predefined threshold pressure.

Upon receiving the warning signal, the warning device 4 informs the driver of the decrease in the inflation pressures of the tires.

To sum up, in the tire inflation pressure sensing apparatus S1 according to the present embodiment, the receiver 3 identifies whether a frame is sent out from one of the transmitters 2 on the running wheels 5a–5d or the spare wheel 5e based on the RSSI signal generated therefor.

Accordingly, it is not necessary for each of the transmitters 2 on the wheels 5a–5e to continuously send out the frame during at least one revolution of the running wheels 5a–5d only for the purpose of spare wheel identification, thus suppressing the electrical power consumption thereof.

It is also not necessary to send out any special signals from each of the transmitters 2 on the wheels 5a–5e to the receiver 3 only for the purpose of spare wheel identification, thus allowing the structure of the tire inflation pressure sensing apparatus S1 not to be unnecessarily sophisticated.

While the above particular embodiment of the invention has been shown and described, it will be understood by those who practice the invention and those skilled in the art that various modifications, changes, and improvements may be made to the invention without departing from the spirit of the disclosed concept.

For example, in the previous embodiment of the invention, the receiver 3 may also be configured such that in the second mode, when both the variations of the levels of the RSSI signals generated for the two received frames are not greater than the predetermined threshold, the receiver 3 repeatedly sends out the trigger signal at predetermined time intervals until either of the variations of the levels of the RSSI signals exceeds the predetermined threshold. As a result, the spare wheel can be more reliably identified.

More over, in the previous embodiment, the sensing unit 21 is included in each of the transmitters 2. However, the sensing unit 21 may also be configured as an external sensing device with respect to each of the transmitters 2.

Similarly, in the previous embodiment, the controlling unit 32b is included in the receiver 3. However, the controlling unit 32b may also be configured as an external ECU (Electrical Control Unit) with respect to the receiver 3.

Such modifications, changes, and improvements within the skill of the art are intended to be covered by the appended claims.

What is claimed is:

1. A tire inflation pressure sensing apparatus comprising:
a first pressure sensor provided on a running wheel of a vehicle, said first pressure sensor working to sense an inflation pressure of a tire mounted on the running wheel and generate a pressure signal representative of the sensed inflation pressure;
a first transmitter provided on the running wheel of the vehicle, said first transmitter being configured to send out the pressure signal generated by said first pressure sensor upon being triggered by a trigger signal;
a second pressure sensor provided on a spare wheel of the vehicle, said second pressure sensor working to sense an inflation pressure of a tire mounted on the spare wheel and generate a pressure signal representative of the sensed inflation pressure;
a second transmitter provided on the spare wheel of the vehicle, said second transmitter being configured to send out the pressure signal generated by said second pressure sensor upon being triggered by the trigger signal; and
a receiver provided on a body of the vehicle, said receiver being configured to:
send out the trigger signal;
operate in a first mode if only the pressure signal sent out from said first transmitter is received, in the first mode said receiver determining the inflation pressure of the tire on the running wheel of the vehicle based on the received pressure signal; and
operate in a second mode if both the pressure signals sent out from said first and said second transmitters are received, in the second mode said receiver generating one RSSI (Received Signal Strength Indicator) signal for each of the two pressure signals, identifying whether each of the two pressure signals is sent out from said first transmitter or said second transmitter based on the RSSI signal generated therefor, and determining the inflation pressure of the tire on the running wheel of the vehicle based on the pressure signal sent out from said first transmitter.

2. The tire inflation pressure sensing apparatus as set forth in claim 1, wherein in the second mode, said receiver identifies one of the two pressure signals as being sent out from said first transmitter if a variation of a level of the RSSI signal generated therefor is greater than a predetermined threshold, or as being sent out from said second transmitter otherwise.

3. The tire inflation pressure sensing apparatus as set forth in claim 2, wherein when both the variations of the levels of the RSSI signals generated for the two pressure signals are not greater than the predetermined threshold, said receiver repeatedly sends out the trigger signal at predetermined time intervals until either of the variations of the levels of the RSSI signals exceeds the predetermined threshold.

4. The tire inflation pressure sensing apparatus as set forth in claim 1 further comprising:
  a plurality of first pressure sensors, each of which is provided on one of a plurality of running wheels of the vehicle and works to sense an inflation pressure of a tire mounted on a corresponding one of the running wheels and generate a pressure signal representative of the sensed inflation pressure; and
  a plurality of first transmitters, each of which is provided on one of the running wheels of the vehicle and is configured to send out the pressure signal generated by a corresponding one of said pressure sensors upon being triggered by a trigger signal, wherein said receiver is configured to:
  sequentially send out the trigger signals, one to each of all said first transmitters, so that said receiver receives the pressure signals sent out from all said first transmitters at different times;
  operate in the first mode if only the pressure signal sent out from one of all said first transmitters is received within a predetermined time period from sending out of a corresponding one of the trigger signals, in the first mode said receiver determining the inflation pressure of the tire mounted on a corresponding one of all the running wheels of the vehicle based on the received pressure signal; and
  operate in the second mode if both the pressure signals sent out from one of all said first transmitters and said second transmitter are received within the predetermined time period from sending out of a corresponding one of the trigger signals, in the second mode said receiver generating one RSSI signal for each of the two pressure signals, identifying whether each of the two pressure signals is sent out from the one of all said first transmitters or said second transmitter based on the RSSI signal generated therefor, and determining the inflation pressure of the tire mounted on a corresponding one of all the running wheels of the vehicle based on the pressure signal sent out from the one of all said first transmitters.

5. The tire inflation pressure sensing apparatus as set forth in claim 4, wherein in the second mode, said receiver identifies one of the two pressure signals as being sent out from the one of all said first transmitters if a variation of a level of the RSSI signal generated therefor is greater than a predetermined threshold, or as being sent out from said second transmitter otherwise.

6. The tire inflation pressure sensing apparatus as set forth in claim 5, wherein when both the variations of the levels of the RSSI signals generated for the two pressure signals are not greater than the predetermined threshold, said receiver repeatedly sends out a corresponding one of the trigger signals to the one of all said first transmitters at predetermined time intervals until either of the variations of the levels of the RSSI signals exceeds the predetermined threshold.

* * * * *